(12) United States Patent
 Oka

(10) Patent No.: US 10,296,514 B2
(45) Date of Patent: May 21, 2019

(54) INFORMATION PROCESSING SYSTEM, METHOD FOR ACQUIRING INFORMATION, INFORMATION PROCESSING APPARATUS AND RECORDING MEDIUM

(71) Applicant: Yosuke Oka, Kanagawa (JP)

(72) Inventor: Yosuke Oka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 417 days.

(21) Appl. No.: 15/138,429

(22) Filed: Apr. 26, 2016

(65) Prior Publication Data

US 2016/0321333 A1 Nov. 3, 2016

(30) Foreign Application Priority Data

Apr. 30, 2015 (JP) .................................. 2015-092644

(51) Int. Cl.
 *G06F 16/25* (2019.01)
 *G06F 3/0484* (2013.01)
 (Continued)

(52) U.S. Cl.
 CPC .......... *G06F 16/258* (2019.01); *G06F 3/0484* (2013.01); *G06Q 10/06* (2013.01); *H04L 12/1827* (2013.01)

(58) Field of Classification Search
 CPC ......... G06F 17/30592; G06F 17/30292; G06F 17/30867; G06F 17/30; G06F 16/258; G06F 3/0484; G06Q 10/06
 (Continued)

(56) References Cited

U.S. PATENT DOCUMENTS 8,743,022 B2 6/2014 Masuda et al.
2001/0044795 A1* 11/2001 Cohen ............... G06F 17/30699
(Continued)

FOREIGN PATENT DOCUMENTS

EP 1980949 10/2008
JP H11-120149 4/1999
(Continued)

OTHER PUBLICATIONS

Anonymous: "Push technology—Wikipedia, the free encyclopedia", Mar. 10, 2015 (Mar. 10, 2015), XP055175163, Retrieved from the Internet: URL: http://en.wikipedia.org/wiki/Push_technology [retrieved on Mar. 10, 2015] *the whole document*.

(Continued)

*Primary Examiner* — Jay A Morrison
*Assistant Examiner* — Ken Hoang
(74) *Attorney, Agent, or Firm* — IPUSA, PLLC

(57) ABSTRACT

There is provided an information processing system including an information processing apparatus and a plurality of terminal devices, wherein each terminal device among the plurality of terminal devices is able to display information in a format supported in the terminal device, the terminal devices acquiring information in formats supported in the respective terminal devices from the information processing apparatus, the information processing apparatus comprising: a memory and one or more processors to execute the program and perform a process including: performing conversion operations for converting newly registered information in a given format into information in a plurality of formats; and distributing a completion report indicating completion of a conversion operation into any one of the plurality of formats upon the conversion operation into the one of the plurality of formats being completed.

12 Claims, 18 Drawing Sheets

(51) Int. Cl.
  *H04L 12/18* (2006.01)
  *G06Q 10/06* (2012.01)
(58) Field of Classification Search
  USPC .......................................................... 707/756
  See application file for complete search history.

(56) References Cited

U.S. PATENT DOCUMENTS

| | | | |
|---|---|---|---|
| 2003/0037034 A1* | 2/2003 | Daniels | G06Q 10/087 |
| 2005/0055357 A1* | 3/2005 | Campbell | G06F 8/61 |
| 2009/0237326 A1 | 9/2009 | Takahashi et al. | |
| 2012/0226823 A1* | 9/2012 | Livnat | G06F 21/10 709/246 |
| 2012/0240023 A1 | 9/2012 | Ohguro | |
| 2012/0303709 A1 | 11/2012 | Fujita et al. | |
| 2013/0081146 A1* | 3/2013 | Hakozaki | H04N 1/00222 726/28 |
| 2015/0058397 A1 | 2/2015 | Kanaya | |

FOREIGN PATENT DOCUMENTS

| | | |
|---|---|---|
| JP | 2005-212250 | 8/2005 |
| JP | 2012-248024 | 12/2012 |
| JP | 2015-62108 | 4/2015 |
| JP | 2015-103131 | 6/2015 |
| WO | 2015/079818 | 6/2015 |

OTHER PUBLICATIONS

Anonymous: "Pull technology—Wikipedia, the free encyclopedia", Feb. 7, 2015 (Feb. 7, 2015), XP055284300, Retrieved from the Internet: URL: https://en.wikipedia.org/w/index.php?title=Pull_technology&oldid=646050792 [retrieved on Jun. 28, 2016] *the whole document*.
Extended European Search Report dated Jul. 13, 2016.
Anonymous: "Scheduling (computing)—Wikipedia", Apr. 24, 2015(Apr. 24, 2015), XP055492027, Retrieved from the Internet:URL:https://en.wikipedia.org/w/index.php?title=Scheduling_(computing)&oldid=659044576 [retrieved on Jul. 12, 2018].
Anonymous: "Pipeline (computing)—Wikipedia", Mar. 11, 2015(Mar. 11, 2015), XP055492307, Retrieved from the Internet:URL:https://en.wikipedia.org/w/index.php?title=Pipeline_(computing)&oldid=650882122 [retrieved on Jul. 12, 2018.
Anonymous: "Instruction pipelining—Wikipedia", Apr. 24, 2015(Apr. 24, 2015), XP055492308, Retrieved from the Internet:URL:https://en.wikipedia.org/w/index.php?title=Instruction_pipelining&oldid=659005665 [retrieved on Jul. 12, 2018].
Office Action dated Jul. 30, 2018 issued with respect to the corresponding European Patent Application No. 16166587.2.
Office Action dated Feb. 19, 2019 issued with respect to the corresponding Japanese Patent Application No. 2015-092644.

* cited by examiner

FIG.8

| CONFERENCE ID | PARTICIPATING TERMINAL |
|---|---|
| XXXX-XXXXXX | 001, 002, ... |
| ⋮ | ⋮ |

FIG.10

| CONFERENCE ID | MATERIAL ID | MATERIAL ADDITION TERMINAL ID |
|---|---|---|
| XXXX-XXXXXX | D010 | ○○○ |
| XXXX-XXXXXX | D020 | △△△ |
| ⋮ | ⋮ | ⋮ |

FIG.11

| MATERIAL ID | URL (FOR DOWNLOAD) | MATERIAL NAME | CONFERENCE ID |
|---|---|---|---|
| D001 | http://xxxx/D001 | 001.ppt | XXXX-XXXXXX |
| D002 | http://xxxx/D002 | 002.ppt | XXXX-XXXXXX |
| D003 | http://xxxx/D003 | 003.pdf | XXXX-XXXXXX |

FIG.18

| TERMINAL ID | TERMINAL TYPE |
|---|---|
| 001 | pad |
| 002 | web |
| ⋮ | ⋮ |

FIG.19

| TERMINAL TYPE | FILE FORMAT |
|---|---|
| pad | pdf |
| web | jpeg |
| ⋮ | ⋮ |

INFORMATION PROCESSING SYSTEM, METHOD FOR ACQUIRING INFORMATION, INFORMATION PROCESSING APPARATUS AND RECORDING MEDIUM

BACKGROUND OF THE INVENTION

1. Field of the Invention

The present disclosure relates to information processing systems, methods for acquiring information, information processing apparatuses and recording media.

2. Description of the Related Art

In conventional electronic conference systems, there is provided a system that converts a file format of conference material into a file format appropriate for a terminal device to which the conference material is distributed.

For example, in conventional conference support systems, a method is known, in which a display manner of additional information is set in accordance with a specification of a terminal for displaying the additional information, and the additional information having been converted into the set display manner is distributed to the terminal (e.g., Patent Document 1).

RELATED ART DOCUMENT

Patent Document

[Patent Document 1]: Japanese Unexamined Patent Application Publication No. 2012-248024

SUMMARY OF THE INVENTION

An object of disclosure of the present technology is to provide an information processing system that is able to start acquisition of an information item upon a conversion process thereon is finished, where the information item needs to be converted into plurality of formats.

The following configuration is adopted to achieve the aforementioned object.

In one aspect of the embodiment of the invention, there is provided an information processing system including an information processing apparatus and a plurality of terminal devices, wherein each terminal device among the plurality of terminal devices is able to display information in a format supported in the terminal device, the terminal devices acquiring information in formats supported in the respective terminal devices from the information processing apparatus, the information processing apparatus comprising: a memory configured to store a program; and one or more processors configured to execute the program stored in the memory and perform a process including: performing conversion operations for converting newly registered information in a given format into information in a plurality of formats; and distributing a completion report indicating completion of a conversion operation into any one of the plurality of formats upon the conversion operation into the one of the plurality of formats being completed; a terminal device of the terminal devices comprising: a memory configured to store a program; and a processor configured to execute the program stored in the memory and perform a process including acquiring, from the information processing apparatus, information whose format is converted into a format supported in the terminal device upon receiving the completion report indicating completion of the conversion operation into the format supported in the terminal device.

Other objects, features and advantages of the present invention will become apparent from the following detailed description when read in conjunction with the accompanying drawings.

BRIEF DESCRIPTION OF THE DRAWINGS

FIG. 8 is a diagram illustrating an example configuration of participating terminal information stored in a participating terminal information DB.

FIG. 10 is a diagram illustrating an example configuration of a material addition management table.

FIG. 11 is a diagram illustrating an example configuration of material information.

FIG. 18 is a diagram illustrating an example configuration of terminal type information of the participating terminals that are participating in the conference.

FIG. 19 is a diagram illustrating an example configuration of file format information on a terminal type-by-terminal type basis.

DETAILED DESCRIPTION OF THE PREFERRED EMBODIMENTS

In the following, embodiments will be described with reference to accompanying drawings. Additionally, in the present embodiment, a conference system is described as an example information processing system. In the conference system of the present embodiment, an electronic conference is held in a manner where a terminal participating in the conference (herein after referred to as a participating terminal) acquires a conference material to display it.

First Embodiment

<System Configuration>

Figure 1:
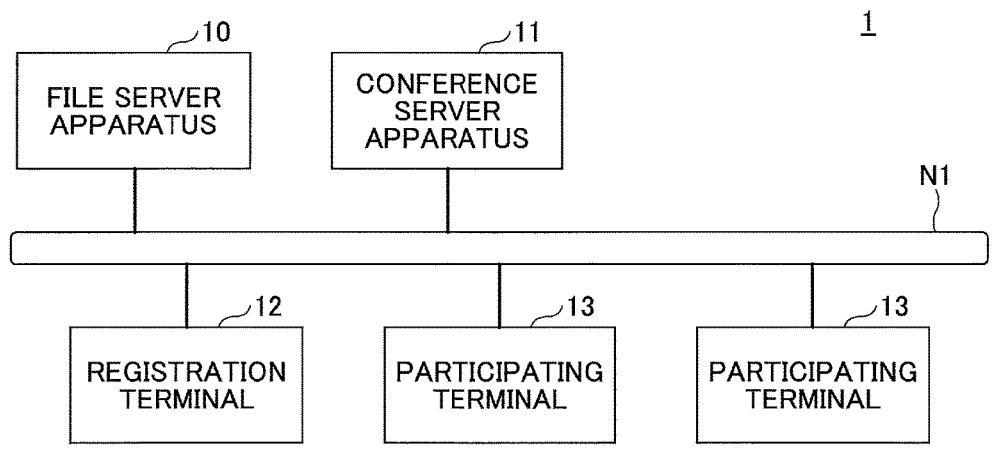
FIG. 1 is a diagram illustrating an example configuration of a conference system of an embodiment of the invention.

FIG. 1 is a drawing for illustrating an example configuration of the conference system of the present embodiment. In the example configuration of the conference system 1 shown in FIG. 1, a file server apparatus 10, a conference server apparatus 11, a registration terminal 12 and a plurality of types of participating terminals 13 are connected to a network N1 such as a LAN.

The file server apparatus 10 manages the conference material. The file server apparatus 10 has a function for accepting a registration of the conference material, a function for distributing the conference material, a function for converting a file format of the conference material, and the like.

The conference server apparatus 11 manages information related to the conference. Also, the conference server apparatus 11 has a function for conferencing or controlling participation, a function for distributing information indicating input operations of a presenter in real time to the respective participating terminals 13 that are participating in the conference, and the like.

The registration terminal 12 has a function for putting the information related to the conference or the conference material in the file server apparatus 10 or the conference server apparatus 11. An organizer or a presenter of the conference can put the information related to the conference or the conference material in the file server apparatus 10 or the conference server apparatus 11 through the registration terminal 12.

The registration terminal 12 is a device operated by the organizer or the presenter of the conference. The registration terminal 12 may be a PC (personal computer), a tablet terminal, a smartphone, a mobile phone, a mobile information terminal such as a PDA or a dedicated terminal used for conference. Also, the registration terminal 12 may be an image forming apparatus such as a printer and a multifunction peripheral, or an image projection apparatus such as a projector.

The participating terminal 13 has a function for acquiring the information related to the conference and the conference material from the file server apparatus 10 or the conference server apparatus 11, a function for participating in the conference, and the like. Further, the participating terminal 13 can acquire the conference material from the file server apparatus 10 during the participation in the conference. The presenter and participants can participate in the conference by using the participating terminal 13. The participating terminal 13 is a device operated by the presenter or the participant of the conference. During the participation in the conference, the participating terminal 13 receives information indicating the input operation of the presenter from the conference server apparatus 11 in real time, and shares display screens with other participating terminals 13.

The participating terminal 13 may be a PC, a tablet terminal, a smartphone, a mobile phone, a mobile information terminal such as a PDA, a display apparatus such as an electronic whiteboard, an image projection apparatus such as a projector, a dedicated terminal used for conference, and the like. The participating terminal 13 may be an image forming apparatus such as a printer and a multifunction peripheral. Additionally, the PC, the tablet terminal, etc., are examples of a terminal device.

The file server apparatus 10 and the conference server apparatus 11 can be realized by software or service performed in a computer. Also, the file server apparatus 10 and the conference server apparatus 11 may be realized by software or service performed in a plurality of computers. For example, the file server apparatus 10 and the conference server apparatus 11 may be realized by using so called cloud services.

<Hardware Configuration>

Figure 2:
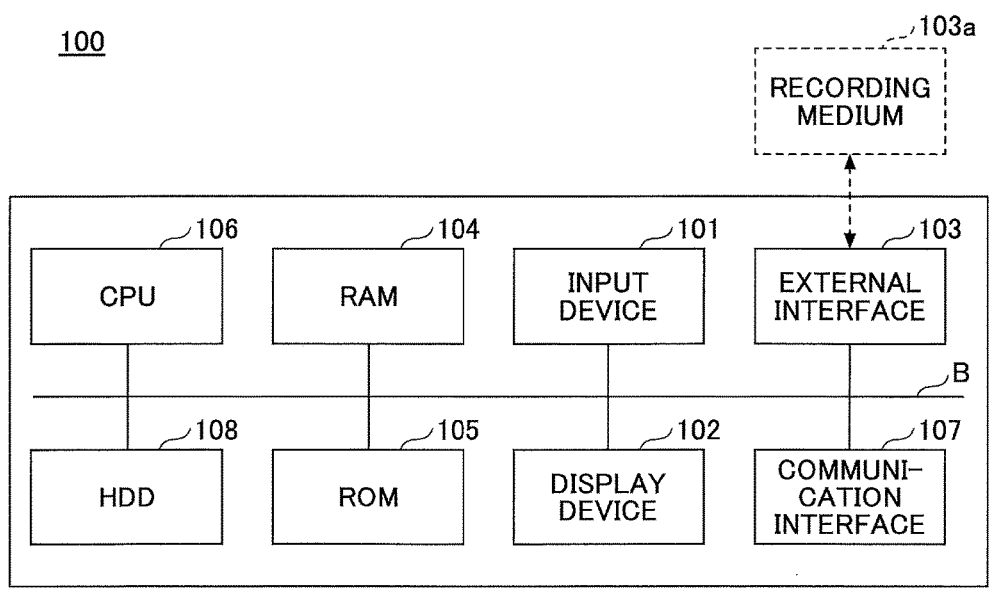
FIG. 2 is a block diagram for illustrating an example hardware configuration of a computer of the first embodiment.

The file server apparatus 10, the conference server apparatus 11, the registration terminal 12 and the participating terminal 13 are respectively achieved by a computer 100 having a hardware configuration shown in FIG. 2. FIG. 2 is a block diagram for illustrating an example hardware configuration of the computer of the present embodiment.

The computer 100 shown in FIG. 2 includes an input device 101, a display device 102, an external interface 103, a RAM 104, a ROM 105, a CPU 106, a communication interface 107, a HDD 108, etc., respectively connected with each other through the bus B. Additionally, the computer 100 shown in FIG. 2 may include a camera, a microphone, a speaker and the like.

The input device 101 includes a keyboard, a mouse, a touch screen, and the like, and is used for inputting operation signals. The display device 102 includes a display and the like, and displays processing results of the computer 100.

The communication interface 107 is an interface for connecting the computer 100 to respective networks. The computer 100 can perform data communication through the communication interface 107.

The HDD 108 is an example of nonvolatile storage device for storing programs or data. The basic software for controlling the entire computer 100 that is an OS, and application software (hereinafter simply referred to as application) for providing functions on the OS exemplify the programs or data to be stored in the HDD 108. The computer 100 may use a drive (e.g., solid state drive: SSD) in which a flash memory is used as a recording medium instead of the HDD 108.

The external interface 103 is an interface to an external device. A recording medium 103a exemplifies the external device. Thus, the computer 100 can read/write the data stored in the recording medium 103a through the external interface 103. A flexible disk, a CD, a DVD, a SD memory card, a USB memory stick, and the like exemplify the recording medium 103a.

The ROM 105 is a nonvolatile semiconductor memory (storage device) capable of holding data even when power is turned off. In the ROM 105, programs and data such as BIOS, OS settings, or network settings are stored, which are executed in starting the computer 100. The RAM 104 is a volatile semiconductor memory (storage device) for temporarily holding programs or data.

The CPU 106 is a processor which retrieves the programs and the data stored in storage devices such as the ROM 105 or the HDD 108 to load them in the RAM 104 and execute them, thereby achieving control or functions of the entire computer 100.

For example, by executing the programs with the above described hardware configuration, the file server apparatus 10, the conference server apparatus 11, the registration terminal 12 and the participating terminal 13 can perform respective processes described below.

<Software Configuration>

In the conference system 1 of the present embodiment, the file server apparatus 10, the conference server apparatus 11, the registration terminal 12 and the participating terminal 13 respectively include, for example, function blocks described below.

<File Server Apparatus>

Figure 3:
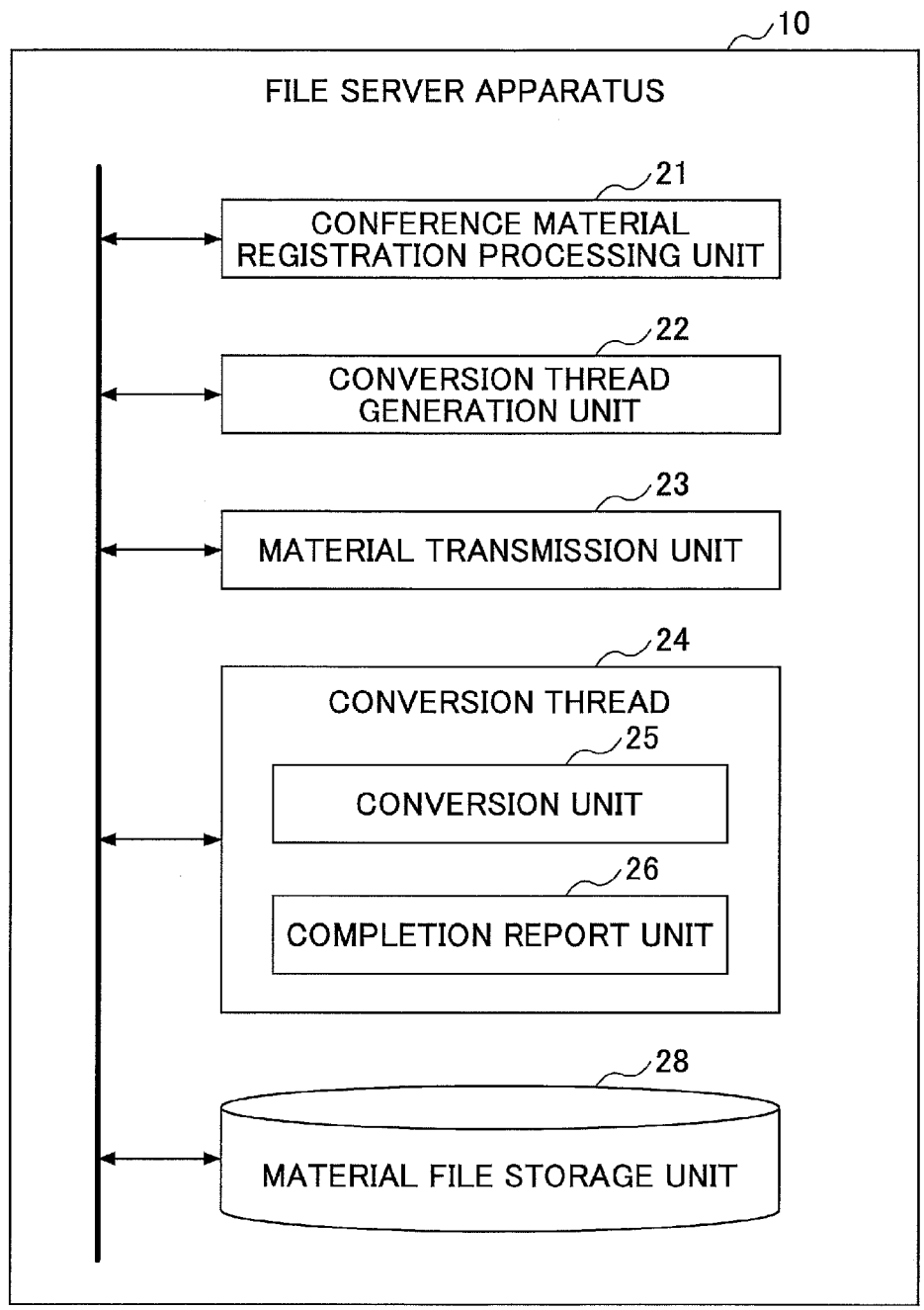
FIG. 3 is a diagram illustrating an example functional configuration of a file server apparatus.

For example, the file server apparatus 10 includes function blocks shown in FIG. 3. FIG. 3 is a diagram for illustrating an example functional configuration of the file server apparatus. In the file server apparatus 10, a conference material registration processing unit 21, a conversion thread generation unit 22, a material transmission unit 23, a conversion thread 24 and a material file storage unit 28 are achieved by executing the program. Additionally, the conversion thread 24 includes a conversion unit 25 and a completion report unit 26. The conversion thread 24 is generated by the conversion thread generation unit 22, and deleted after completing a certain process.

The conference material registration processing unit 21 accepts a registration request of the conference material from the registration terminal 12 before the conference starts, and preforms registration process of the conference material. Also, the conference material registration processing unit 21 accepts another registration request (addition request) for adding item of the conference material during the conference, and performs addition process of the conference material.

The conversion thread generation unit 22 generates the conversion thread 24 for converting the file format of the conference material whose registration request or addition request has been accepted. The material transmission unit 23 transmits the conference material to a participating terminal 13 in response to a material acquisition request from the participating terminal 13.

The conversion thread 24 converts the file format of the conference material, whose registration request or addition request has been accepted, into a plurality of file formats respectively required by the participating terminals 13. The conversion unit 25 of the conversion thread 24 converts the file format of the conference material, whose registration request or addition request has been accepted, into a plurality of file formats. The completion report unit 26 of the conversion thread 24 transmits a completion report to the conference server apparatus 11 upon each of the conversion process into one of the plurality of file formats by the conversion unit 25 being completed.

Additionally, the completion report unit 26 may transmits the completion report indicating the file format of the conference material whose registration request or addition request has been accepted to the conference server apparatus 11. A unit, other than the completion report unit 26, for transmitting the completion report indicating the file format of the conference material whose registration request or addition request has been accepted may be further provided.

Also, material file storage unit 28 stores the conference material in response to the registration request or the addition request thereof in a file format as it is, and stores the same in a plurality of file formats converted by the conversion thread 24.

<Conference Server Apparatus>

Figure 4:
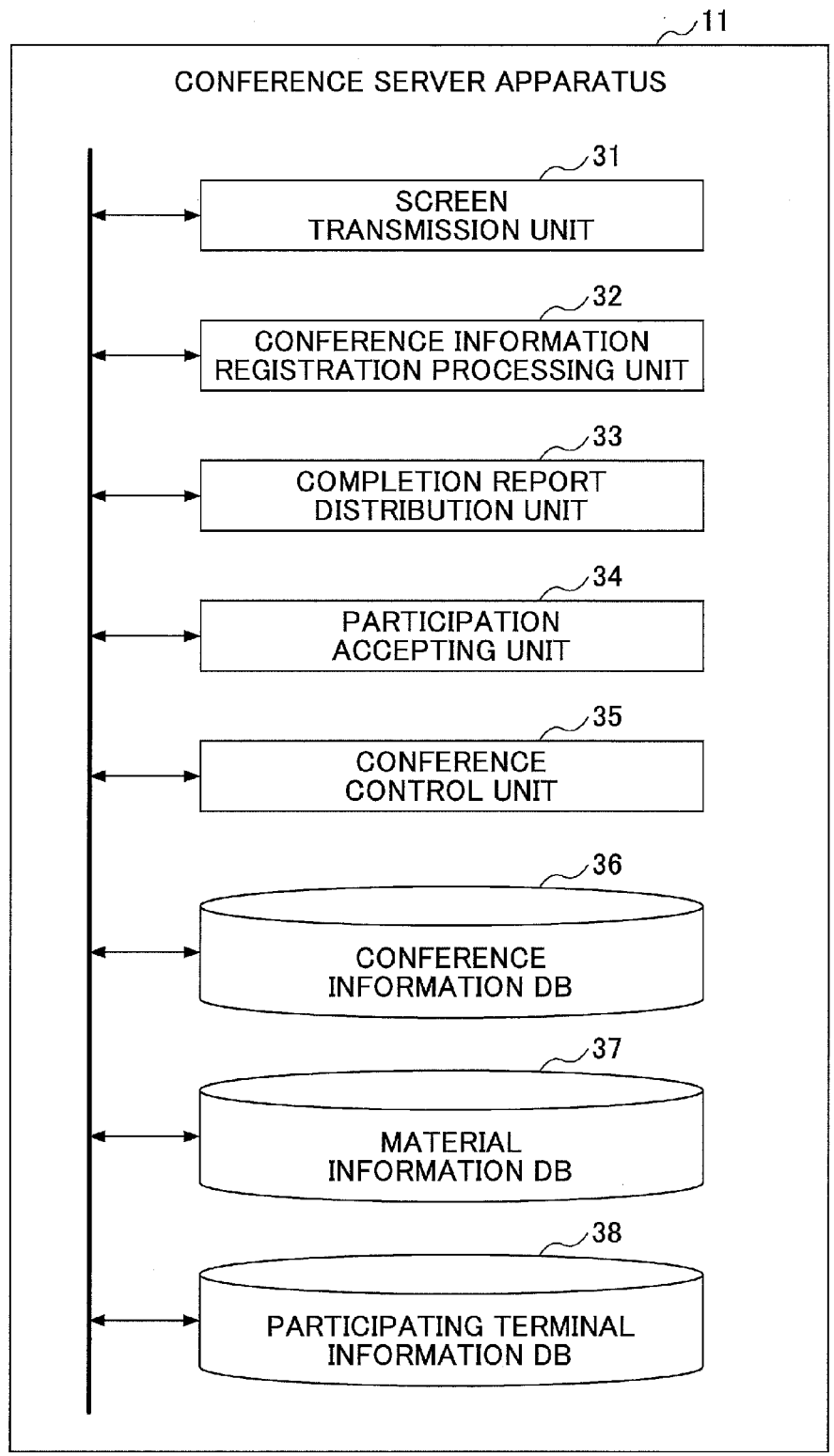
FIG. 4 is a block diagram illustrating a functional configuration of a conference server apparatus.

For example, the conference server apparatus 11 includes function blocks shown in FIG. 4. FIG. 4 is a block diagram for illustrating a functional configuration of the conference server apparatus. In the conference server apparatus 11, a screen transmission unit 31, a conference information registration processing unit 32, a completion report distribution unit 33, a participation accepting unit 34, a conference control unit 35, a conference information DB 36, a material information DB 37 and a participating terminal information DB 38 are achieved by executing the program.

The screen transmission unit 31 transmits conference registration screen data to the registration terminal 12 in response to an access request from the registration terminals 12. The conference information registration processing unit 32 accepts registration request of information related to the conference from the registration terminal, and put it in the conference information DB 36 or the material information DB 37.

Upon receiving a completion report of conversion indicating the file format from the file server apparatus 10, the completion report distribution unit 33 distributes the completion report of the conversion operation to the registration terminal 12 and the participating terminal 13 in a manner described below. The participation accepting unit 34 transmits information related to a conference which can be convened or participated in to a participating terminal 13, in response to a conference information acquisition request from the participating terminal 13. Also, the participation accepting unit 34 transmits in-conference information that is required for sharing display screen to a participating terminal 13 in response to a participation request from the participating terminal 13.

The conference control unit 35 accepts the input operation from the participating terminal 13 of the presenter. The conference control unit 35 distributes information indicating the input operation of the presenter to the respective participating terminals 13 participating in the conference to have them share the display screen. The conference information DB 36 stores the conference information. The material information DB 37 stores the material information of the conference material used in the conference. Additionally, a storage place of the conference material used in the conference is recorded in the material information. The participating terminal information DB 38 stores terminal IDs of the participating terminal participating in the conference.

<Registration Terminal>

Figure 5:
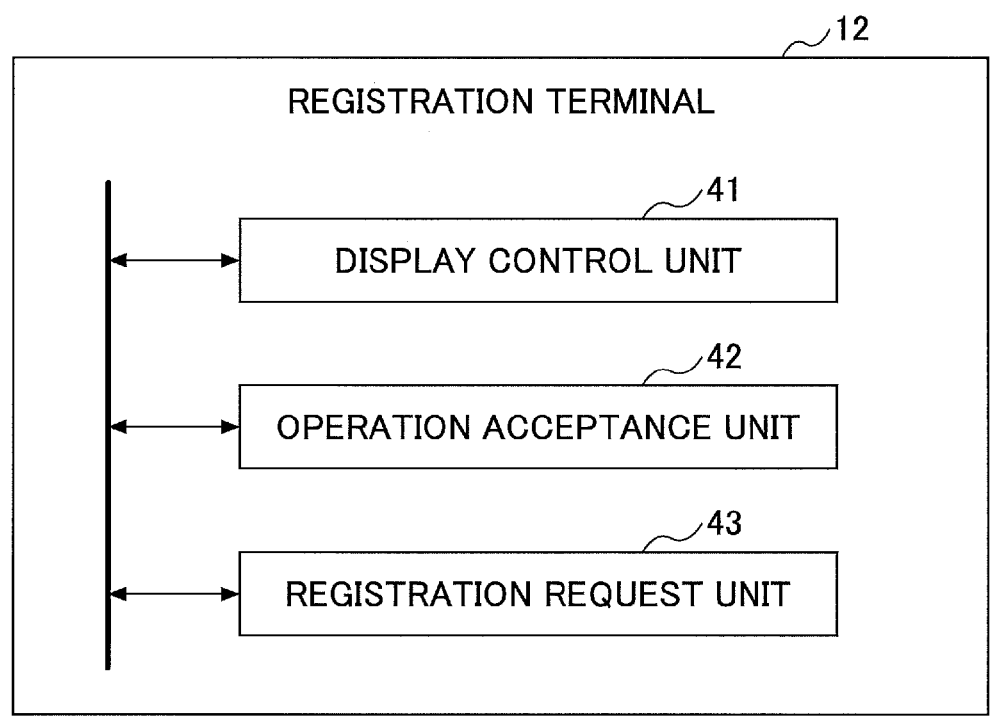
FIG. 5 is a block diagram illustrating an example functional configuration of a registration terminal.

For example, the registration terminal 12 includes function blocks shown in FIG. 5. FIG. 5 is a block diagram illustrating an example functional configuration of the registration terminal. In the registration terminal 12, a display control unit 41, an operation acceptance unit 42 and a registration request unit 43 are achieved by executing the program.

The display control unit 41 performs a process for displaying the conference registration screen, etc., in response to operation of the organizer or the presenter of the conference. The operation acceptance unit 42 accepts operations input by the organizer or the presenter in the conference registration screen, and a registration instruction or an addition instruction of the conference material. The registration request unit 43 transmits a registration request of the information related to the conference, which is input in the conference registration screen, to the conference server apparatus 11, thereby putting the information related to the conference in the conference apparatus 11. Also, the registration request unit 43 transmits a registration request or an addition request of the conference material to the file server apparatus 10 in response to the registration instruction or the addition instruction from the organizer or the presenter.

<Participating Terminal>

Figure 6:
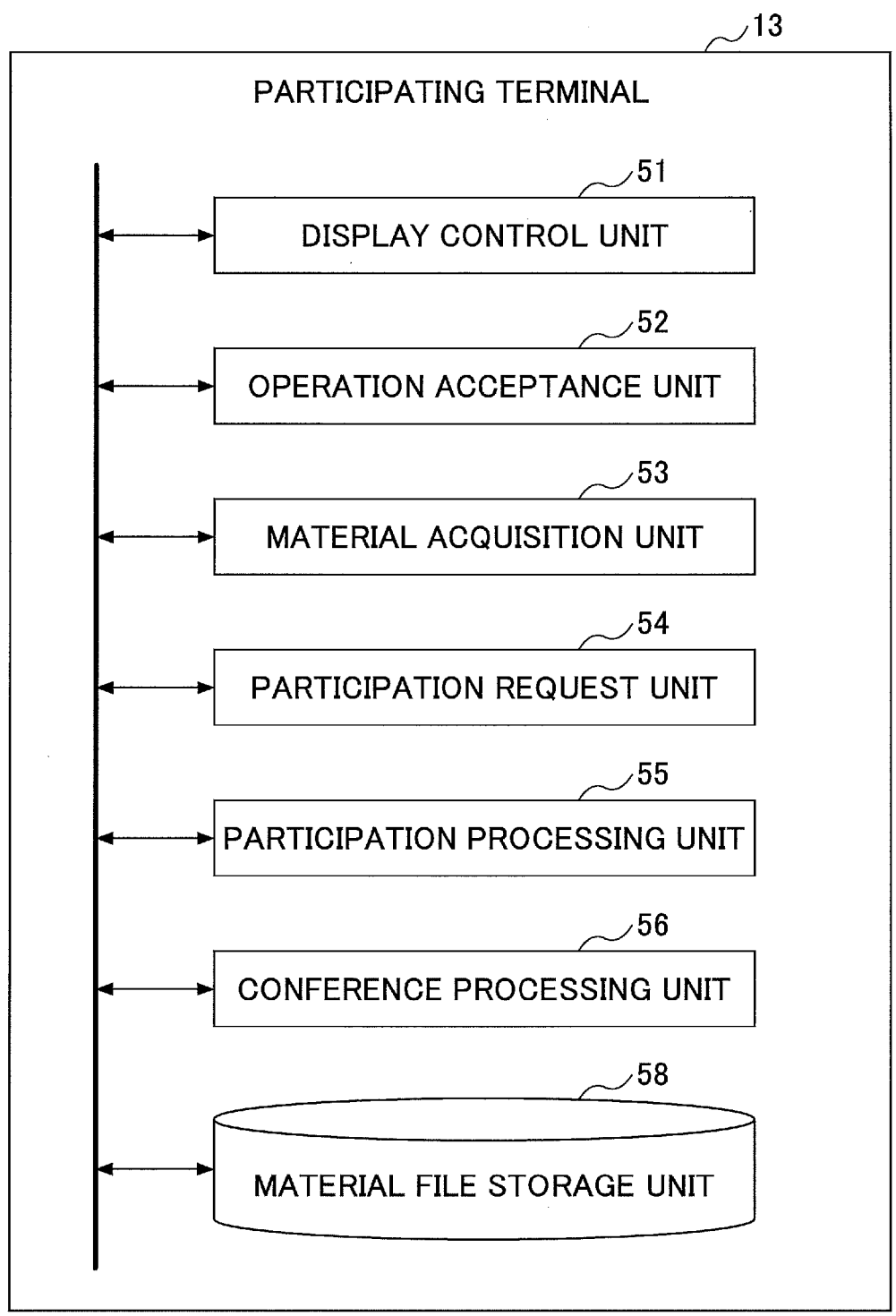
FIG. 6 is a block diagram illustrating an example functional configuration of participating terminal.

For example, the participating terminal 13 includes function blocks shown in FIG. 6. FIG. 6 is a block diagram illustrating an example functional configuration of the participating terminal. In the participating terminal 13, a display control unit 51, an operation acceptance unit 52, a material acquisition unit 53, a participation request unit 54, a participation processing unit 55, a conference processing unit 56 and a material file storage unit 58 are achieved by executing the program. For example, the program executed in the participating terminal 13 is the application installed in the participating terminal 13.

The display control unit 51 performs a process for displaying a conference participation screen and a conference screen in response to operations input by the presenter or the participant. The operation acceptance unit 52 accepts operation input in the conference participation screen or the conference screen by the presenter or the participant. The material acquisition unit 53 transmits a material acquisition request to the file server apparatus 10 to acquire the conference material in a required file format from the file server apparatus 10. The participating terminal 13 can display a file or data in a case where the file of data is in a file format supported in the participating terminal 13. For example, a participating terminal 13A supports a file format A while a participating terminal 13B supports a file format B. However, the conference system 1 supports many file formats A, B, C, . . . . Therefore, the participating terminal 13A needs to acquire the conference material in the file format A and the participating terminal 13B needs to acquire the conference material in the file format B among the conference material in the file formats A, B, C, . . . . The participation request unit 54 transmits an acquisition request of information related to the conference to the conference server apparatus 11, thereby acquiring the information related to the conference which can be convened or participated in from the conference server apparatus 11. Also, the participation request unit 54 transmits a participation request to the conference server apparatus 11 to receive the in-conference information required for sharing the display screen from the conference server apparatus 11.

The participation processing unit 55 performs a conference participation process described below. The conference processing unit 56 performs an operation for sharing the display screen by updating the conference screen based on the input operation of the presenter that is distributed from the conference server apparatus 11. The material file storage unit 58 stores conference material in respective file formats required by the participating terminals 13.

<Details of Process>

In the following, details of a process performed by the conference system 1 of the present embodiment will be described.

<Conference Participation Process>

Figure 7:
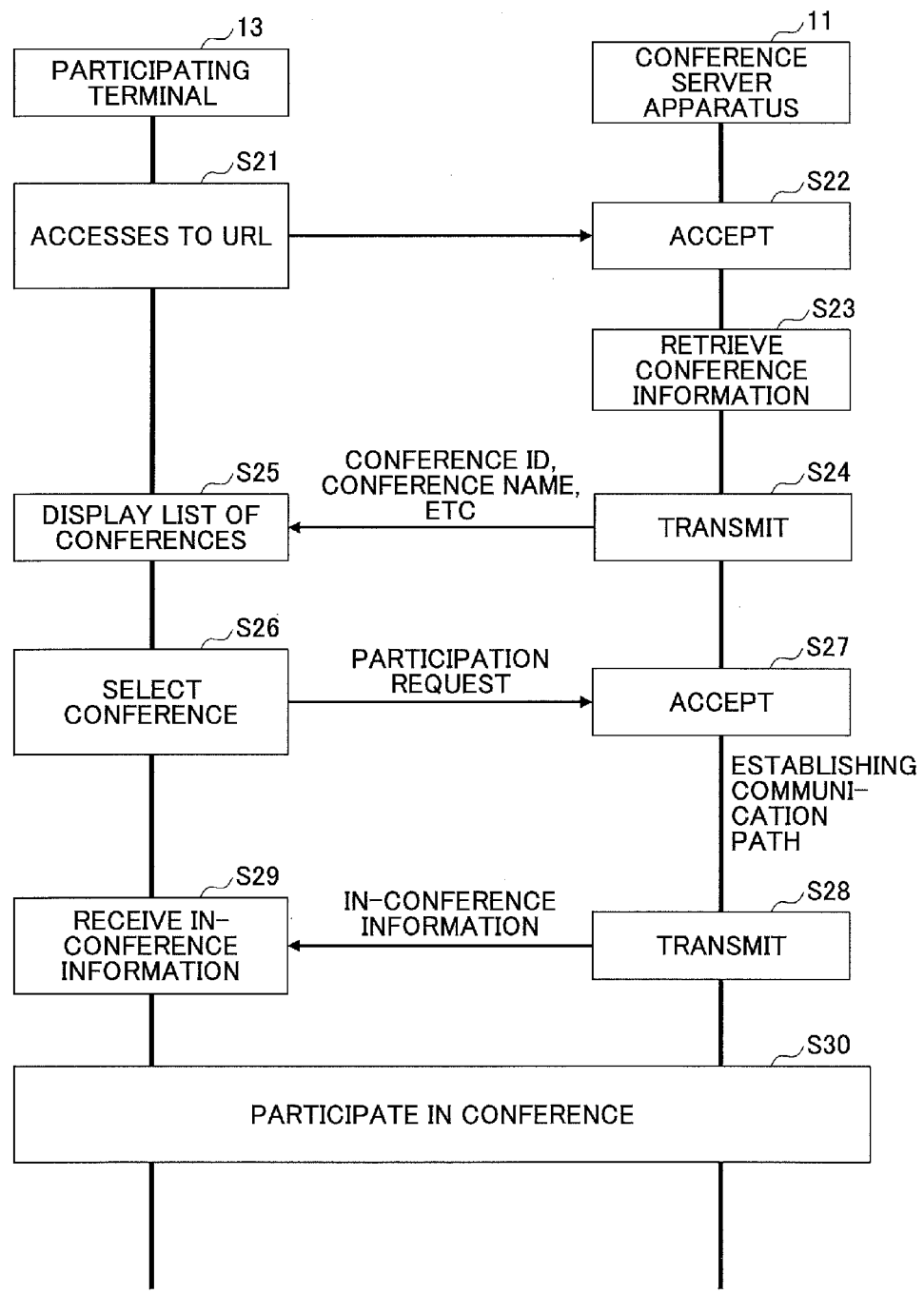
FIG. 7 is a flowchart illustrating an example conference participation process.

FIG. 7 is a flowchart for illustrating an example conference participation process. The presenter or the participant of the conference operates the participating terminal 13 to request the access to the conference participation screen of the conference server apparatus 11. In step S21, for example, the participation request unit 54 of the participating terminal 13 accesses to an URL of the conference participation screen of the conference server apparatus 11, etc., to request information related to the conference.

In step S22, the participation accepting unit 34 of the conference server apparatus 11 accepts the acquisition request of the information related to the conference from the participating terminal 13. In step S23, the participation accepting unit 34 retrieves the conference information and the material information of the conference which can be convened or participated in from the conference information DB 36 and the material information DB 37 in response to the acquisition request from the participating terminal 13.

In step S24, the participation accepting unit 34 transmits conference participation screen data to the participating terminal 13, where the conference participation screen data includes the conference information and the material information of the conference which can be currently convened or participated in. In step S25, the display control unit 51 of the participating terminal 13 causes the display device 102, etc., to display the conference participation screen based on the conference participation screen data received from the conference server apparatus 11.

In step S26, the presenter or the participant of the conference selects a conference to be convened or participated in from a list of conferences displayed in the conference participation screen. Then, for example, the presenter or the participant of the conference presses a participation button displayed in the conference participation screen. The participation request unit 54 of the participating terminal 13 transmits the participation request to the conference server apparatus 11, where the participation request is for requesting participation in the conference selected in the conference participation screen by the presenter or the participant.

In step S27, the participation accepting unit 34 of the conference server apparatus 11 establishes a communication path based on the participation request from the participating terminal 13. Then, the conference server apparatus 11 and the participating terminal 13 that is participating in the conference transmit/receive items such as in-conference information required for sharing the display screen, etc., by using the established communication path.

As described above, the conference server 11 and the participating terminal 13 that is participating in the conference share the conference screen by using the established communication path to distribute in real time, through the conference server apparatus 11, information indicating the operational input in the participating terminal 13 of the presenter to those of the participants. A protocol referred to as "XMPP" is exemplified as a protocol for such a real time distribution using the communication path.

XMPP has been standardized as RFC3920 (Extensible Messaging and Presence Protocol: Core), and RFC3921 (Extensible Messaging and Presence Protocol: Instant Messaging and Presence) in IETF, and an extended specification thereof has been documented as XEP.

A service referred to as Multi-User Chat (XEP-0045) is defined in XMPP. In Multi-User Chat, when the participating terminal 13 that is participating in a room provided by XMPP transmits a message to the conference server apparatus 11, the message is distributed from the conference server apparatus 11 to all of the participating terminals 13 participating in the room. For example, other than XMPP, protocols such as BOSH which is an extended XMPP, WebSocket or Commet may be used for establishing such a communication path.

BOSH (Bidirectional-streams Over Synchronous HTTP (XEP-0206)) is a technology for transmitting/receiving message of HTTP in XMPP. Such a protocol enables the conference server apparatus 11 to perform "Push" function. With the "Push" function, the conference server apparatus 11 can asynchronously transmit information to the participating terminals 13 without receiving the request from the participating terminals 13, thereby receiving the information by the participating terminal 13. Additionally, similar functions may be achieved by using a common HTTP where the participating terminal 13 needs to periodically retrieve the information.

In step S28, in response to the participation request, the participation accepting unit 34 of the conference server apparatus 11 transmits the in-conference information required for sharing the display screen to the participating terminal 13. For example, in the in-conference information required for sharing the display screen, information (conference ID, material ID, etc.) indicating the conference material currently displayed, current page, information related to the presenter (a user currently performing a presentation) and the like may be included.

In step S29, the participation request unit 54 of the participating terminal 13 receives the in-conference information required for sharing the display screen. In step S30, the participation processing unit 55 of the participating terminal 13 participates in the conference based on the received in-conference information.

According to the conference participation process shown in FIG. 7, the participation accepting unit 34 of the conference server apparatus 11 can record a terminal ID of the participating terminal 13 in e.g., participating terminal information shown in FIG. 8. FIG. 8 is a diagram illustrating an example configuration of participating terminal information stored in the participating terminal information DB. In the participating terminal information shown in FIG. 8, the conference ID is associated with the terminal ID of participating terminal 13 that is participating in the conference. According to the participating terminal information shown in FIG. 8, the conference server apparatus 11 can specify the terminal ID of the participating terminal 13 that is participating in the conference specified by the conference ID.

<Addition Process of Conference Material During Conference>

Figure 9:
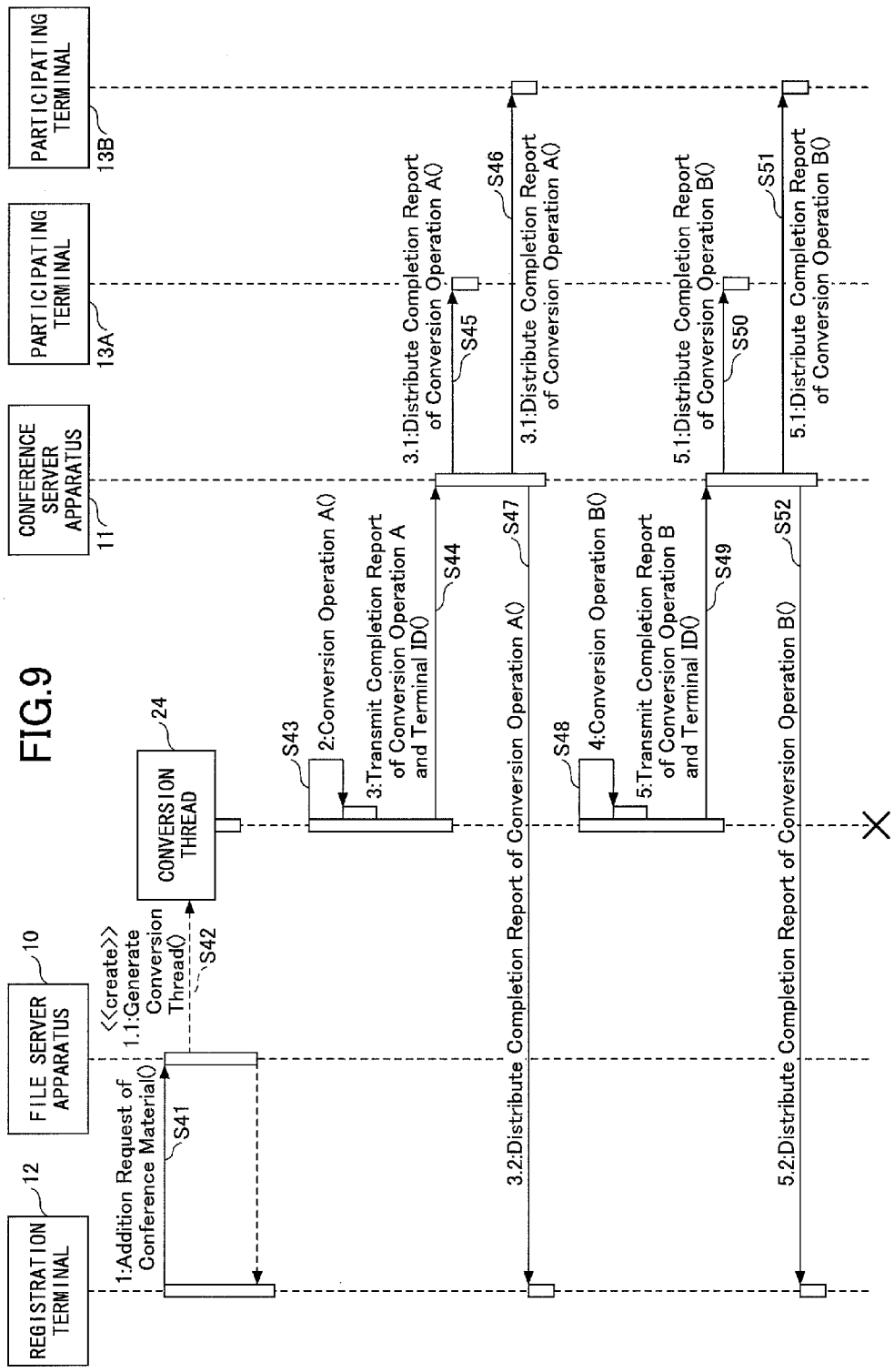
FIG. 9 is a sequence diagram illustrating an example addition process of a conference material during a conference.

FIG. 9 is a sequence diagram illustrating an example addition process of the conference material during the conference. In the example shown in FIG. 9, the participating terminal 13A uses the conference material in a file format converted through a conversion operation A, while the participating terminal 13B uses the conference material in a file format converted through a conversion operation B.

In step S41, the registration terminal 12 transmits an addition request of the conference material to the file server apparatus 10 in response to an addition instruction of the conference material accepted from the organizer or the presenter of the conference. The file server apparatus 10 stores the conference material whose addition request is accepted from the registration terminal 12 in the material file storage unit 28, where the conference material is stored in a format (e.g., a file format for the application) as it is.

In step S42, the file server apparatus 10 generates a conversion thread 24 for converting the file format of the conference material whose addition request has been accepted into a plurality of types of file format. The conversion thread 24 converts the file format of the conference material into the plurality of types of file format. Additionally, for example, the plurality of types of file format converted by the conversion thread 24 means all of file formats supported by the conference system 1. In the sequence diagram shown in FIG. 9, the conversion thread 24 performs the conversion operation in a sequence of the conversion operation A and the conversion operation B, thereby converting the file format of the added conference material.

In step S43, the conversion thread 24 performs the conversion operation A on the conference material whose addition request has been accepted, thereby converting the file format of the conference material. The file server apparatus 10 stores the conference material in the material file storage unit 28 in the file format (e.g., in PDF file format) converted through the conversion operation A. After the conversion operation A is completed, in step S44, the conversion thread 24 transmits the completion report of the conversion operation A and the terminal ID of the terminal used by a user who has requested to add the conference material to the conference server apparatus 11. In the completion report of the conversion operation A, the conference ID, the material ID, the file format after the conversion operation, etc., are included.

The conference server apparatus 11 accepts the completion report of the conversion operation A and the terminal ID of the terminal used by the user who has requested to add the conference material from the conversion thread 24. The conference server apparatus 11 acquires the terminal IDs of the participating terminals 13A and 13B that are participating in the conference refereeing to the participating terminal information shown in FIG. 8.

In step S45, the conference server apparatus 11 distributes the completion report of the conversion operation A to the participating terminal 13A based on the acquired terminal ID of the participating terminal 13A that is participating in the conference. According to the completion report of the conversion operation A in step S45, the participating terminal 13A can recognize that the conference material in the file format converted through the conversion operation A can be acquired from the file server apparatus 10.

Also, in step S46, the conference server apparatus 11 distributes the completion report of the conversion operation A to the participating terminal 13B based on the acquired terminal ID of the participating terminal 13B that is participating in the conference. According to the completion report of the conversion operation A in step S46, the participating terminal 13B can recognize that the conference material in the file format converted through the conversion operation A can be acquired from the file server apparatus 10.

In step S47, the conference server apparatus 11 distributes the completion report of the conversion operation A to the registration terminal 12 based on the terminal ID of the terminal used by the user who has requested to add the conference material. Additionally, in a case where the conference server apparatus 11 accepts an abnormal completion report of the conversion operation A and the terminal ID of the terminal used by the user who has requested to add the conference material from the conversion thread 24, the processes of steps S45 and S46 are skipped and the abnormal completion report of the conversion operation A is reported to the registration terminal 12 in step S47.

Also, in step S48, the conversion thread 24 performs the conversion operation B on the conference material whose addition request has been accepted, thereby converting the file format of the conference material. The file server apparatus 10 stores the conference material in the material file storage unit 28 in the file format (e.g., in JPEG file format) converted through the conversion operation B. The conversion operation B may be performed on the conference material whose file format has been converted in step S43. After the conversion operation B is completed, in step S49, the conversion thread 24 transmits the completion report of the conversion operation B and the terminal ID of the terminal used by a user who has requested to add the conference material to the conference server apparatus 11. Similarly to the completion report of the conversion operation A, in the completion report of the conversion operation B, the conference ID, the material ID, the file format after the conversion operation, etc., are included.

The conference server apparatus 11 receives the completion report of the conversion operation B and the terminal ID of the terminal used by a user who has requested to add the conference material from the conversion thread 24. The conference server apparatus 11 acquires the terminal IDs of the participating terminals 13A and 13B that are participating in the conference refereeing to the participating terminal information shown in FIG. 8.

In step S50, the conference server apparatus 11 distributes the completion report of the conversion operation B to the participating terminal 13A based on the acquired terminal ID of the participating terminal 13A that is participating in the conference. According to the completion report of the conversion operation B in step S50, the participating terminal 13A can recognize that the conference material in the file format converted through the conversion operation B can be acquired from the file server apparatus 10.

Also, in step S51, the conference server apparatus 11 distributes the completion report of the conversion operation B to the participating terminal 13B based on the acquired terminal ID of the participating terminal 13B that is participating in the conference. According to the completion report of the conversion operation B in step S51, the participating terminal 13B can recognize that the conference material in the file format converted through the conversion operation B can be acquired from the file server apparatus 10.

In step S52, the conference server apparatus 11 distributes the completion report of the conversion operation B to the registration terminal 12 based on the terminal ID of the terminal used by the user who has requested to add the conference material. Additionally, in a case where the conference server apparatus 11 accepts an abnormal completion report of the conversion operation B and the terminal ID of the terminal used by the user who has requested to add the conference material from the conversion thread 24, the processes of steps S50 and S51 are skipped and the abnormal completion report of the conversion operation B is reported to the registration terminal 12 in step S52.

FIG. 10 is a diagram illustrating an example configuration of a material addition management table. For example, the material addition management table shown in FIG. 10 can be created based on the completion report of the conversion operation A and the terminal ID of the terminal used by the user who has requested to add the conference material from the conversion thread 24 in step S44 shown in FIG. 9.

The conference ID, the material ID and the terminal ID of the terminal used by the user who has requested to add the conference material are included as the items in the material addition management table shown in FIG. 10. The conference ID is example identification information of the conference in which the conference material is used. The material ID is example identification information of the conference material. The terminal ID of the terminal used by the user who has requested to add the conference material (material addition terminal ID) is the terminal ID of the registration terminal 12 of the organizer or the presenter of the conference who has requested to add the conference material.

According to the material addition management table shown in FIG. 10, the conference server apparatus 11 can distribute the completion reports of the conversion operations A and B to the registration terminals 12 of the organizer or the presenter of the conference who has requested to add the conference material in steps S47 and S52.

Also, the material information DB 37 of the conference server apparatus 11 stores the material information as shown in FIG. 11. FIG. 11 is a diagram illustrating an example configuration of the material information. In the material information shown in FIG. 11, a material ID, a URL (for download), a material name and the conference ID are included as items thereof.

The material ID is example identification information of the conference material. The URL (for download) is information indicating a storage place of the conference material. The material name is a name of the conference material. Additionally, in FIG. 11, the material name is indicated by a file name (including extension) of the conference material as it is accepted with the registration instruction or the addition instruction from the organizer or the presenter of the conference. The conference ID is example identification information of the conference in which the conference material is used.

For example, the participating terminals 13A and 13B access the URL (for download) included in the material information shown in FIG. 11 with designating a desired file format, thereby acquiring the conference material in the designated format from the file server apparatus 10.

Figure 12:
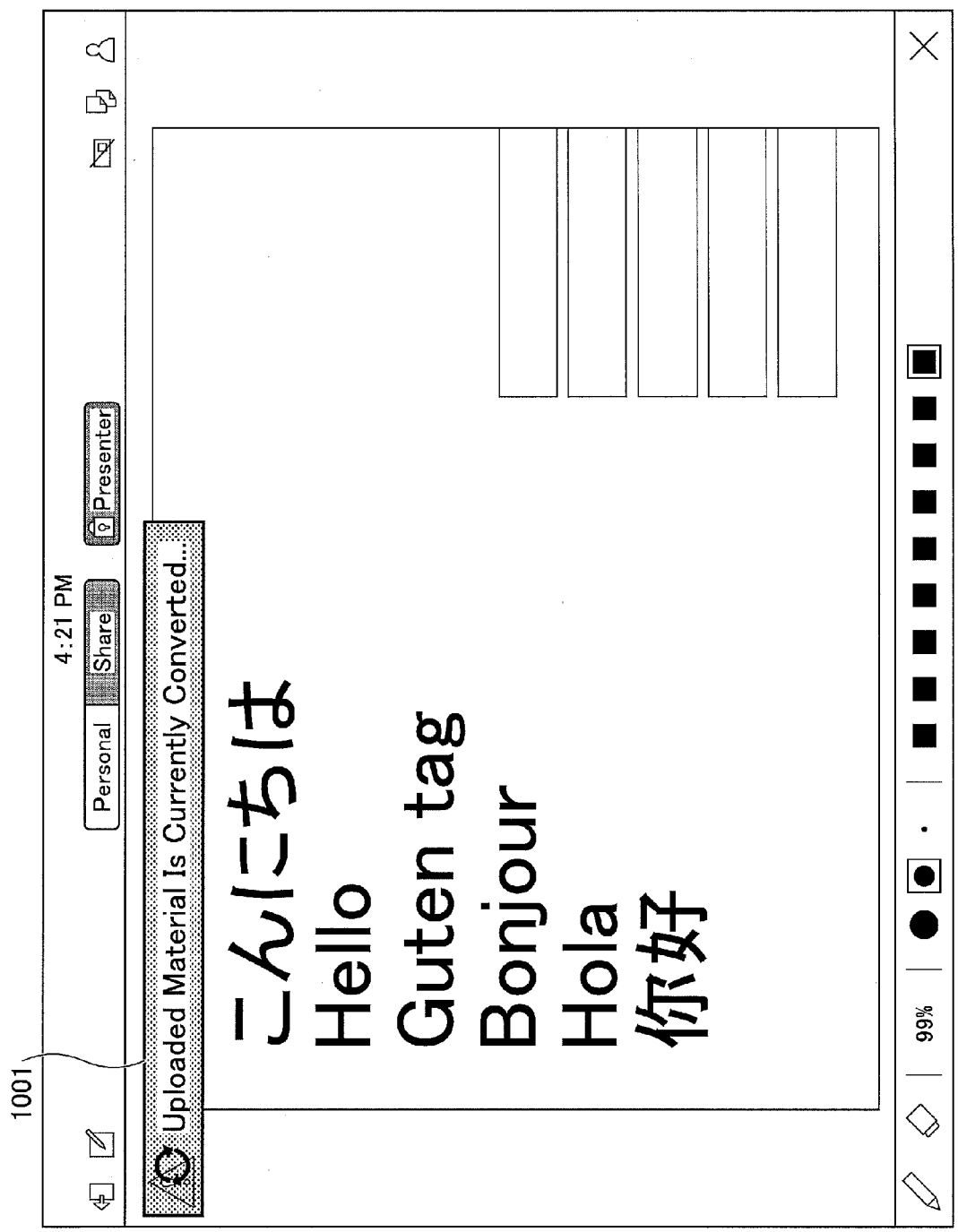
FIG. 12 is a diagram illustrating an example screen displayed on the registration terminal after transmitting an addition request of the conference material.

Additionally, for example, after transmitting the addition request of the conference material to the file server apparatus 10 in step S41 shown in FIG. 9, the registration terminal 12 displays a screen as shown in FIG. 12. FIG. 12 is a diagram illustrating an example screen displayed on the registration terminal after transmitting the addition request of the conference material. Additionally, in a case where the addition request of the conference material is transmitted from the participating terminal 13, the participating terminal 13 displays the screen as shown in FIG. 12.

In the screen shown in FIG. 12, a message 1001 indicating that the file format of the conference material whose addition request has been transmitted is currently converted by the file server apparatus 10.

Additionally, the registration terminal 12 may change a content of the massage 1001 or finish displaying the message 1001 based on the completion report transmitted from the conference server apparatus 11 in steps S47 and S50.

Also, the registration terminal 12 may change the content of the massage 1001 or finish displaying the message 1001 by periodically accessing the file server apparatus 10 to check conversion state of the file format of the conference material.

Figure 13:
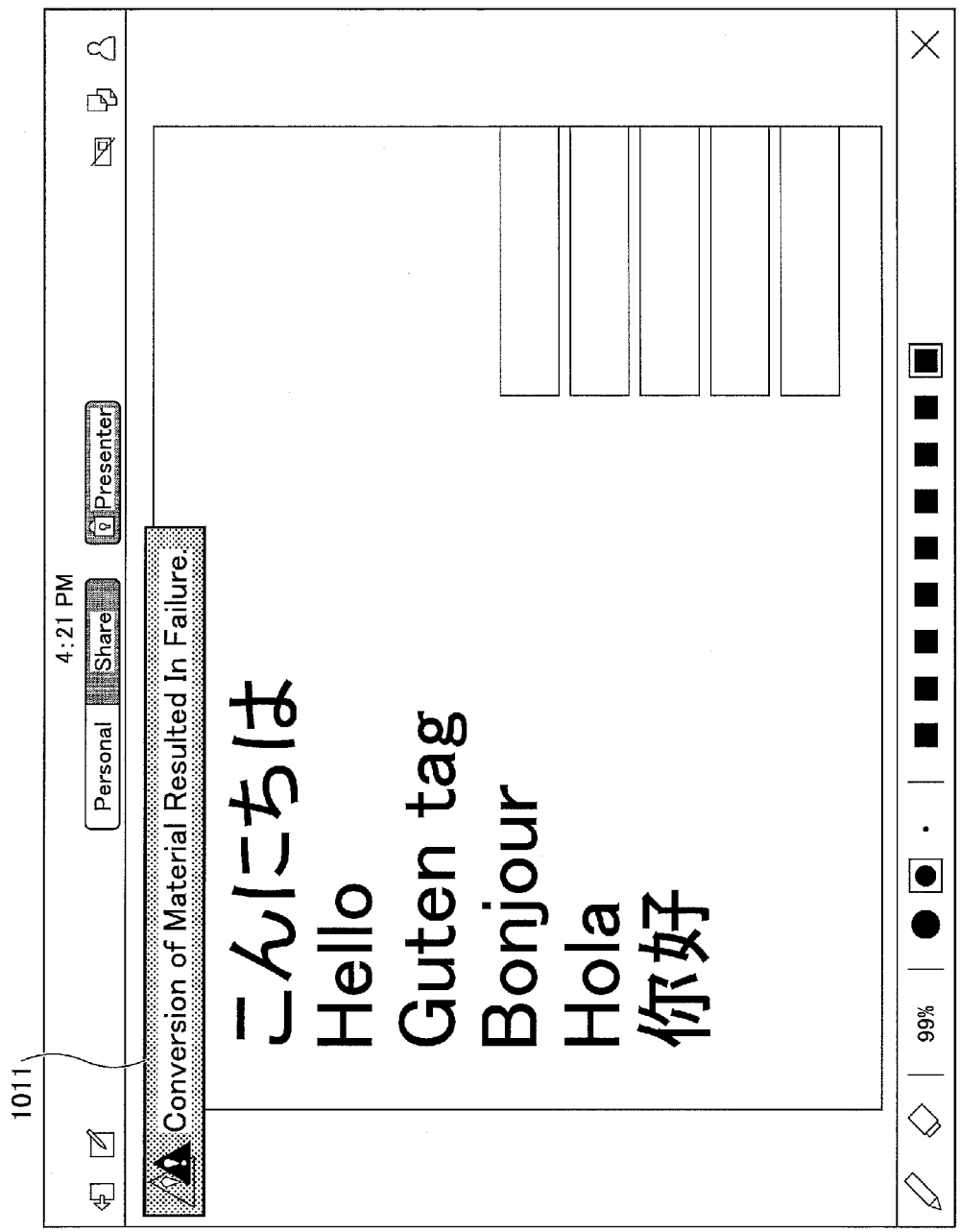
FIG. 13 is a diagram illustrating a screen displayed in a case where an error occurs in the conversion operation of a file format of the conference material.

In a case where an error occurs in the conversion operation of the file format of the conference material, for example, the registration terminal 12 or the participating terminal 13 displays a screen as shown in FIG. 13. FIG. 13 is a diagram illustrating a screen displayed in a case where an error occurs in the conversion operation of the file format of the conference material. In the screen shown in FIG. 13, a message 1011 indicating that a failure of conversion operation of the file format of the conference material is shown.

Figure 14:
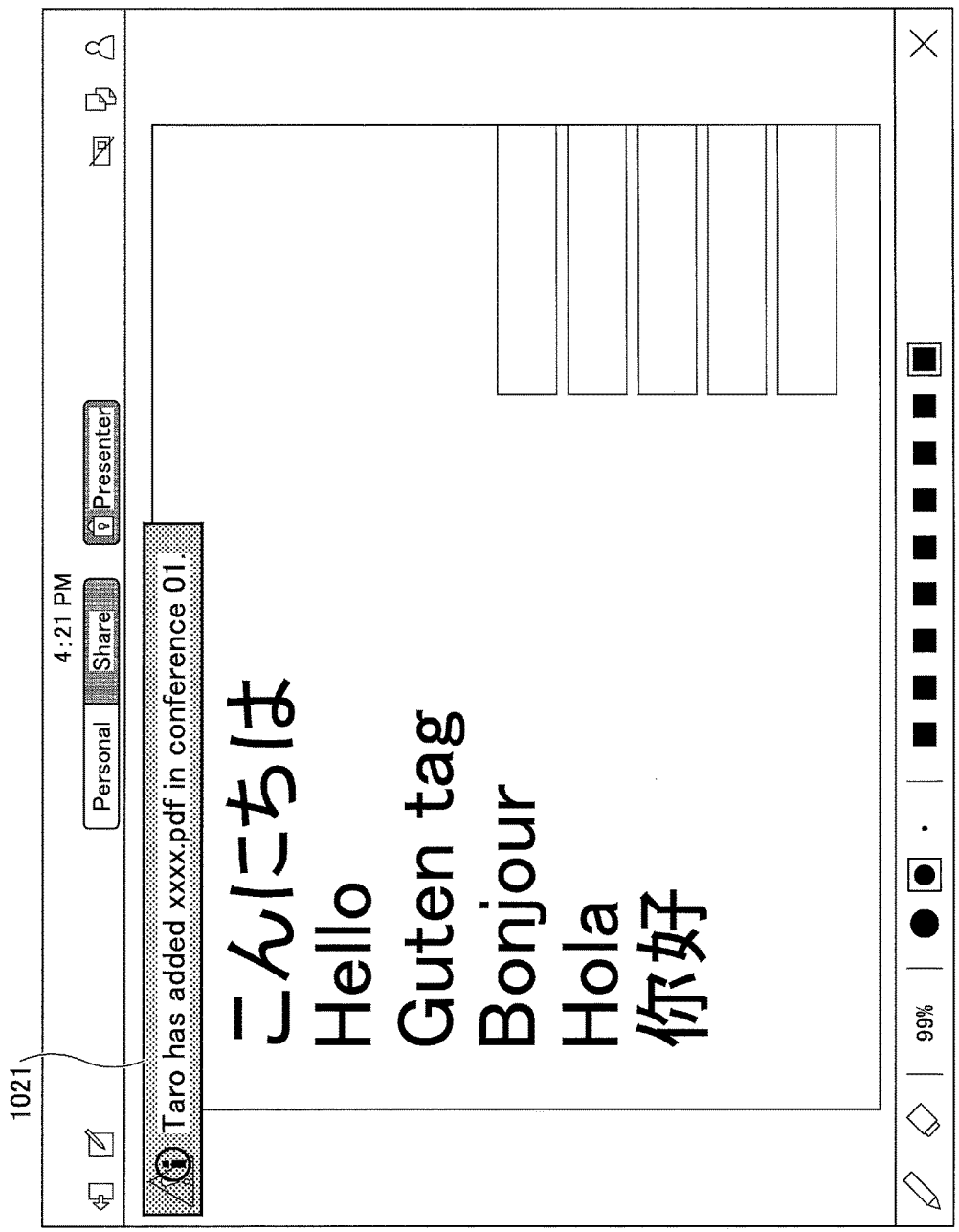
FIG. 14 is a diagram illustrating an example screen displayed in a case where a completion report of a conversion operation A is received.

For example, in response to receiving the completion report of the conversion operation A from the conference server apparatus 11 in step S45 shown in FIG. 9, the participating terminal 13A displays a screen as shown in FIG. 14. FIG. 14 is a diagram illustrating an example screen displayed in a case where the completion report of the conversion operation A is received. The example screen shown in FIG. 14 is for a case where a type of the participating terminal 13A is "pad". In the screen shown in FIG. 14, a message 1021 indicating that (an item of) the conference material has been added is shown.

Figure 15:
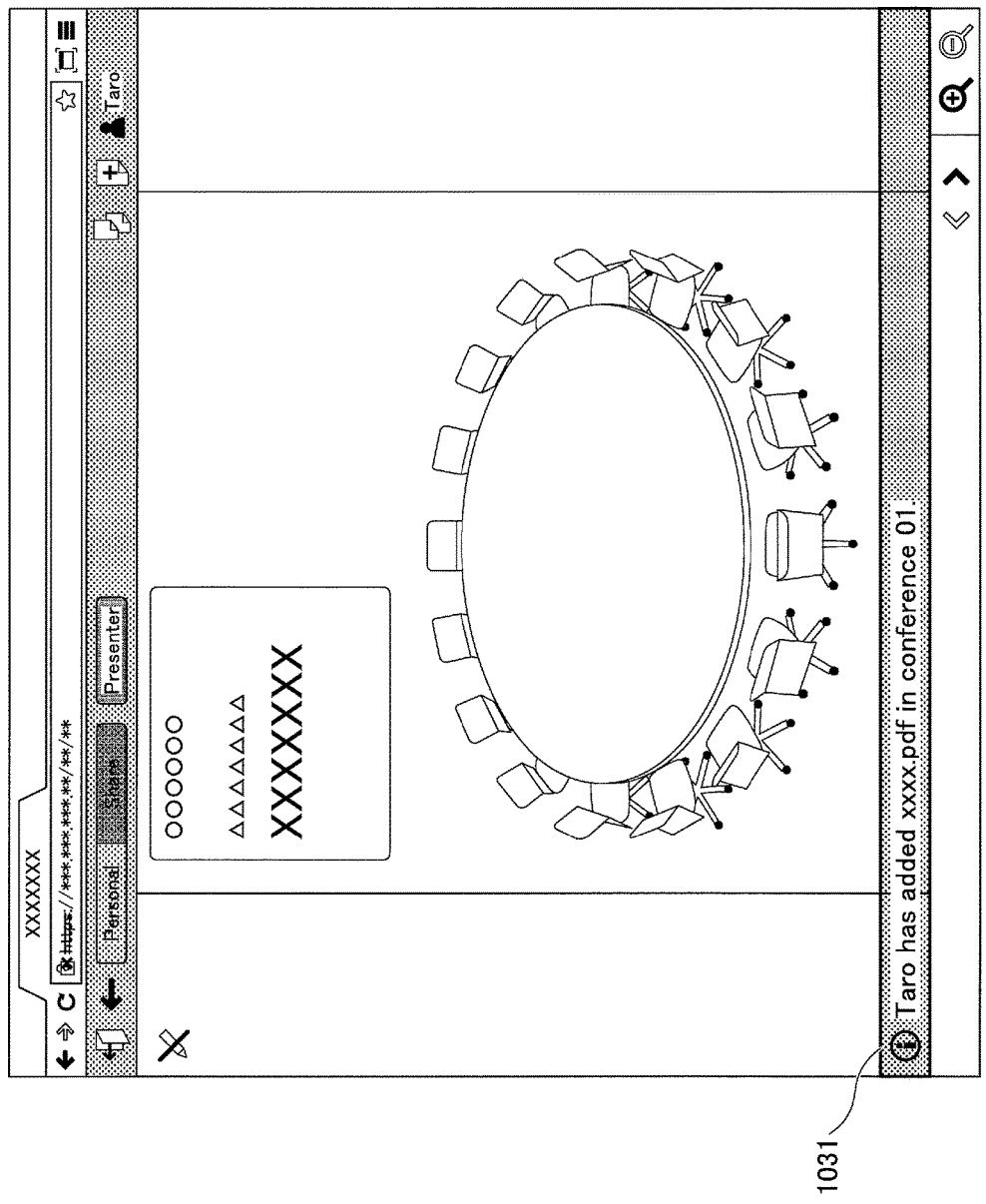
FIG. 15 is a diagram illustrating another example screen displayed in a case where the completion report of the conversion operation A is received.

Also, in response to receiving the completion report of the conversion operation A from the conference server apparatus 11 in step S46 shown in FIG. 9, the participating terminal 13B displays a screen as shown in FIG. 15. FIG. 15 is a diagram illustrating another example screen displayed in a case where the completion report of the conversion operation A is received. The example screen shown in FIG. 15 is for a case where a type of the participating terminal 13A is "web (PC)". In FIG. 15, a message 1031 indicating that the conference material has been added is shown in the web browser screen.

Therefore, the presenter or the participant of the conference can recognize that the conference material has been added and the file format of the conference material that can be acquired from the file server apparatus 10 by referring to the screen shown in FIG. 14 or FIG. 15 displayed by the participating terminal 13A or 13B.

Figure 16:
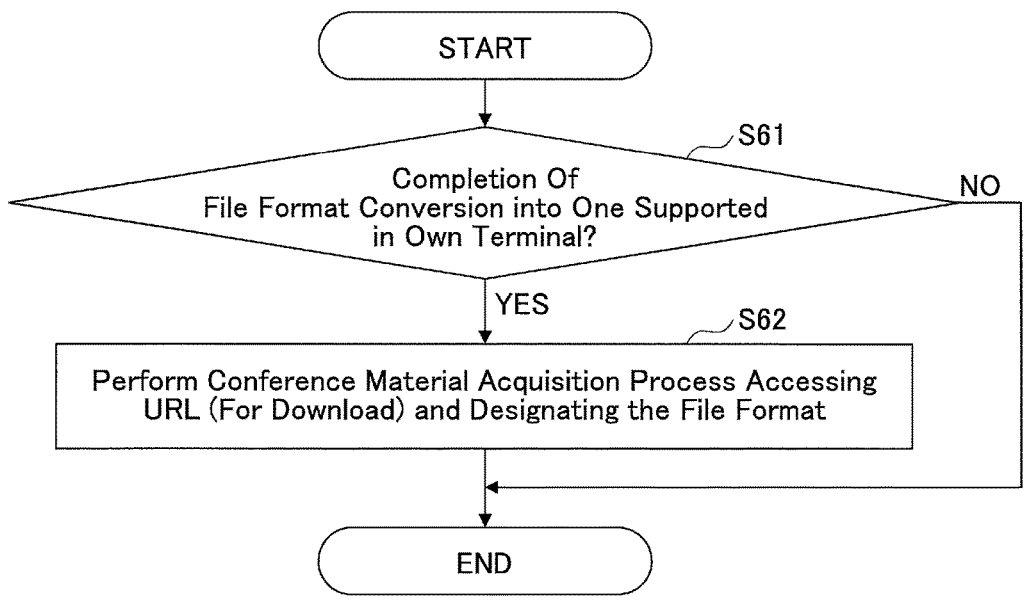
FIG. 16 is a flowchart illustrating an example conference material acquisition determination process.

For example, the participating terminal 13A having received the completion report of the conversion operation A from the conference server apparatus 11 in step S45 or the participating terminal 13B having received the completion report of the conversion operation A from the conference server apparatus 11 in step S46 may perform a process shown in FIG. 16.

FIG. 16 is a flowchart illustrating an example conference material acquisition determination process. In the following, descriptions are given in a case where the process is performed by the participating terminal 13A.

In step S61, the participating terminal 13A determines whether the completion operation of the conversion operation A received in step S45 from the conference server apparatus 11 indicates the completion of file format conversion into one supported in the own terminal (into a file format which can be handled by the participating terminal 13A). For example, in a case where the file format supported in the own terminal is "pdf" and the file format converted through the conversion operation A is "pdf", the participating terminal 13A determines that the completion report of the conversion operation A received in step S45 from the conference server apparatus 11 indicates the completion of file format conversion into one supported in the own terminal.

In response to determining that the completion report indicates the completion of file format conversion into one supported in the own terminal, in step S62, the participating terminal 13A performs a conference material acquisition process accessing the URL (for download) included in the material information and designating the file format "pdf" using extension, and the like. Additionally, in a case where the completion report is determined not to indicate the completion of file format conversion into one supported in the own terminal, the participating terminal 13A does not perform the process of step S62.

As described above, the participating terminals 13A and 13B can recognize that the completion of the file format conversion into one supported in the own terminal performed in the file server apparatus 10 by receiving the completion report of the conversion operation into the file format. Therefore, the participating terminals 13A and 13B can start acquiring the conference material in the supported file format from the file server apparatus 10 upon receiving the completion report of the conversion operation into the file format. Additionally, the participating terminals 13A and 13B may accept an instruction to acquire the added conference material from the presenter or the participant who has referred to the screen shown in FIG. 14 or FIG. 15.

The participating terminal 13B that receives the completion report of the conversion operation A in step S46 shown in the sequence diagram of FIG. 9 does not start acquiring the conference material because the completion report is determined not to indicate the completion of the file format conversion into one supported in the own terminal. However, for example, when information indicating a number of pages in the conference material is included in the completion report of the conversion operation A (step S46), the participating terminal 13B can recognize the number of pages of the conference material in advance. For example, in a case where the file format supported in the participating terminal 13B is "jpeg", the participating terminal 13B can recognize a number of files to be acquired from the file server apparatus 10 based on the number of the pages of the conference material.

The sequence of the conversion operation A and the conversion operation B performed by the conversion thread 24 and shown in the sequence diagram of FIG. 9 is non-limiting example. Also, in the conference system 1, conversion operations of the file format may be performed in parallel by using a plurality of conversion threads 24.

<Conference Material Acquisition Process>

Figure 17:
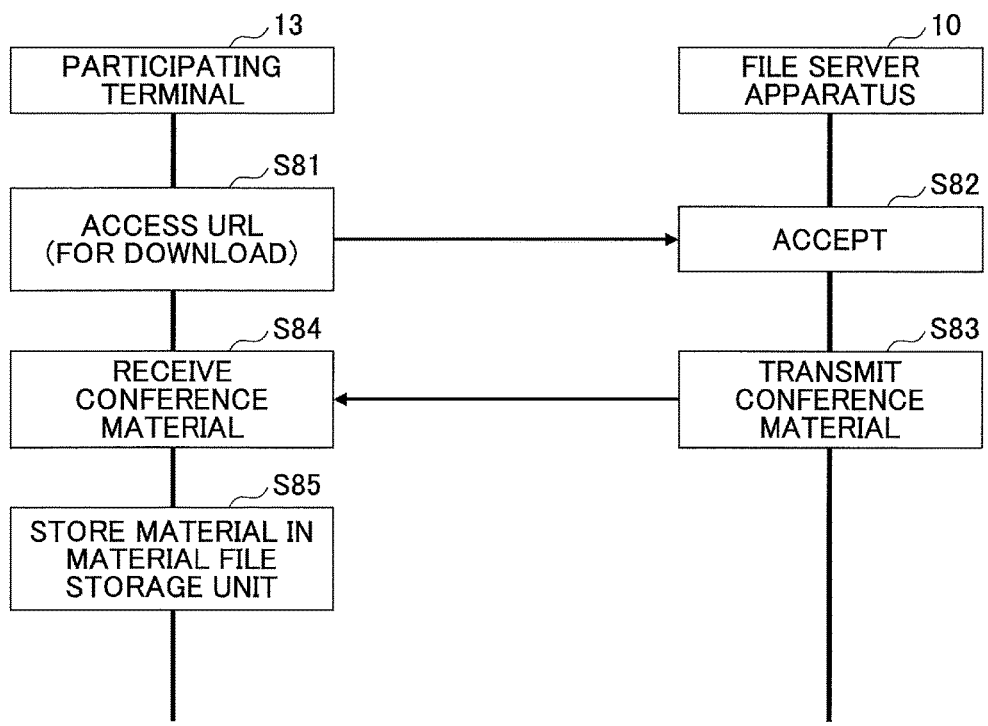
FIG. 17 is a flowchart illustrating an example conference material acquisition process.

FIG. 17 is a flowchart illustrating an example conference material acquisition process. In step S81, the participating terminal 13 accesses the URL (for download) included in the material information to request for acquisition of the material (material acquisition request) designating a desired file format.

In step S82, the file server apparatus 10 accepts the material acquisition request designating the file format from the participating terminal 13. In step S83, the file server apparatus 10 transmits the conference material in the designated file format to the participating terminal 13 in response to the material acquisition request from the participating terminal 13.

In step S84, the participating terminal 13 receives the conference material in the designated file format from the conference server apparatus 11 as a response to the material acquisition request. In step S85, the participating terminal 13 stores the conference material in the material file storage unit 58.

<Summary>

According to the conference system 1 of the present embodiment, in a case where the added conference material is distributed to a participating terminal 13, which can display the conference material in one of a plurality of file formats, the conference material can be started to be distributed upon being converted into the one of the plurality of file formats without waiting for completion of conversion operations into other file formats. In the conference system 1 of the present embodiment, information indicating that the conference material is ready to be distributed is reported to the participating terminals 13 that are participating in the conference using the completion report of the file conversion operation indicating the converted file format.

Therefore, in the conference system 1 of the present embodiment, a participating terminal 13 can start acquiring the conference material upon receiving the completion report of the conversion operation into a file format that is supported in the participating terminal 13. Hence, in the conference system 1 of the present embodiment, timings at which a plurality of the participating terminals 13 acquire the conference materials from the file server apparatus 10 vary, thereby achieving a network load dispersion. Also, in the conference system 1 of the present embodiment, time taken for starting distribution of the conference material can be shortened because the participating terminal 13 can acquire the conference material from the file server apparatus 10 without waiting for completion of the conversion operation into a file format that is not supported in the participating terminal 13.

As described above, in the conference system 1 of the present embodiment, time taken from addition of the conference material in a certain file format to distribution of the conference material to the participating terminal 13 can be shortened, where a plurality of file formats are supported in the conference system 1 while the participating terminal 13 supports one of a plurality of file formats.

Second Embodiment

In the first embodiment, the completion report is distributed to all of the participating terminals 13 that are participating in the conference. In the second embodiment, the completion report of conversion operation is distributed to selected participating terminals 13 which support the file format converted through the conversion operation of the completion report. Additionally, except for a part of embodiment, the second embodiment is similar to the first embodiment. Therefore, descriptions thereof may be omitted.

The system configuration and the hardware configuration of the second embodiment are similar to those of the first embodiment. The second embodiment is different from the first embodiment in a part of the software configuration of the conference server apparatus 11. A terminal type (type of terminal) of the participating terminal 13 that is participating in the conference and a file format supported by the participating terminal 13 are stored in the participating terminal information DB 38.

FIG. 18 is a diagram illustrating example configuration of terminal type information of the participating terminals that are participating in the conference. For example, the terminal type information of the participating terminals 13 that are participating in the conference is stored in the participating terminal information DB 38. The terminal ID is associated with the terminal type in the terminal type information of the participating terminals 13 that are participating in the conference. According to the terminal type information shown in FIG. 18, the conference server apparatus 11 can specify the terminal types of the participating terminals 13 that are participating in the conference, where the participating terminals 13 that are participating in the conference are specified based on the terminal IDs thereof. Additionally, for example, the conference server apparatus 11 can acquire the terminal type information shown in FIG. 18 from the participating terminal 13 through the conference participation process shown in FIG. 7.

Also, FIG. 19 is a diagram illustrating an example configuration of file format information on a terminal type-by-terminal type basis. The terminal type is associated with the file format supported by the participating terminal in the file format information on a terminal type-by-terminal type basis. According to the file format information shown in FIG. 19, the conference server apparatus 11 can specify the supported file format on a terminal type-by-terminal type basis.

<Details of Process>

In the following, details of a process of the conference system 1 of the second embodiment will be described.

<Addition Process of Conference Material During Conference>

Figure 20:
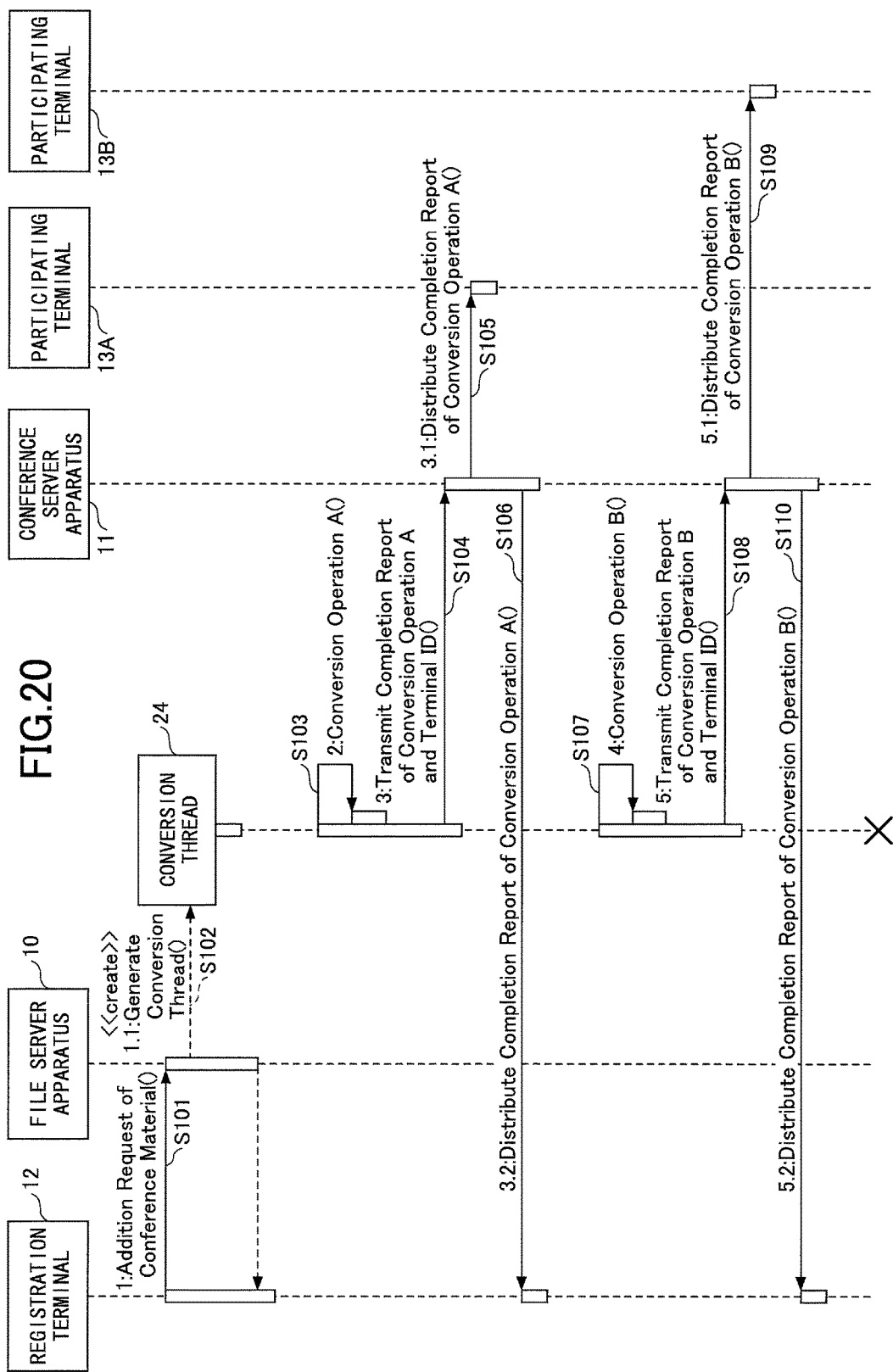
FIG. 20 is a sequence diagram illustrating another example addition process of the conference material during the conference.

FIG. 20 is a sequence diagram illustrating another example addition process of the conference material during the conference. In the example shown in FIG. 20, the participating terminal 13A uses the conference material in a file format converted through a conversion operation A, while the participating terminal 13B uses the conference material in a file format converted through a conversion operation B.

Processes of steps S101-S104 are similar to those of steps S41-S44 in FIG. 9. Therefore, descriptions thereof are omitted. The conference server apparatus 11 accepts the completion report of the conversion operation A and the terminal ID of the terminal used by a user who has requested to add the conference material from the conversion thread 24.

The conference server apparatus 11 selects the participating terminal 13A, which supports the file format converted through the conversion operation A, as described below. In step S105, the conference server apparatus 11 distributes the completion report of the conversion operation A to the participating terminal 13A, which supports the file format converted through the conversion operation A.

According to the completion report of the conversion operation A in step S105, the participating terminal 13A can recognize that the conference material in the file format converted through the conversion operation A can be acquired from the file server apparatus 10.

In step S106, the conference server apparatus 11 distributes the completion report of the conversion operation A to the registration terminal 12 based on the terminal ID of the terminal used by the user who has requested to add the conference material. Additionally, in a case where the conference server apparatus 11 accepts an abnormal completion report of the conversion operation A and the terminal ID of the terminal used by the user who has requested to add the conference material from the conversion thread 24, the process of step S105 is skipped and the abnormal completion report of the conversion operation A is reported to the registration terminal 12 in step S106.

Processes of steps S107 and S108 are similar to those of steps S48 and S49 in FIG. 9. Therefore, descriptions thereof are omitted. The conference server apparatus 11 accepts the completion report of the conversion operation B and the terminal ID of the terminal used by the user who has requested to add the conference material from the conversion thread 24.

The conference server apparatus 11 selects the participating terminal 13B, which supports the file format converted through the conversion operation B, as described below. In step S109, the conference server apparatus 11 distributes the completion report of the conversion operation B to the participating terminal 13B, which supports the file format converted through the conversion operation B.

According to the completion report of the conversion operation B in step S109, the participating terminal 13B can recognize that the conference material in the file format converted through the conversion operation B can be acquired from the file server apparatus 10.

In step S110, the conference server apparatus 11 distributes the completion report of the conversion operation B to the registration terminal 12 based on the terminal ID of the terminal used by the user who has requested to add the conference material. Additionally, in a case where the conference server apparatus 11 accepts an abnormal completion report of the conversion operation B and the terminal ID of the terminal used by the user who has requested to add the conference material from the conversion thread 24, the process of step S109 is skipped and the abnormal completion report of the conversion operation B is reported to the registration terminal 12 in step S110.

Figure 21:
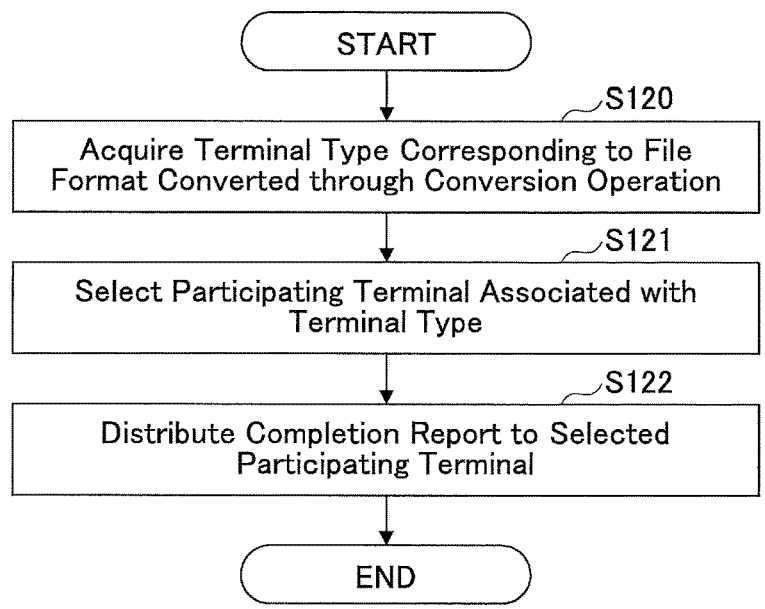
FIG. 21 is a flowchart illustrating an example process for distributing the completion report of the conversion operation.

In the sequence diagram of FIG. 20, the conference server apparatus 11 selects the participating terminal 13A, which supports the file format converted through the conversion operation A, and the participating terminal 13B, which supports the file format converted through the conversion operation B, as shown in FIG. 21.

FIG. 21 is a flowchart illustrating an example process for distributing the completion report of the conversion operation. In step S120, the conference server apparatus 11 acquires the terminal type corresponding to the file format converted through the conversion operation whose completion is reported by the completion report by referring to the information shown in FIG. 19.

In step S121, the conference server apparatus 11 selects the terminal ID of the participating terminal 13 associated with the terminal type acquired in step S120 by referring to the information shown in FIG. 18. In step S122, the conference server apparatus 11 distributes the completion report to the participating terminal 13 whose terminal ID is selected in step S121.

According to the flowchart of FIG. 21, the conference server apparatus 11 can distribute the completion report to the selected participating terminals 13, which support the file format converted through the conversion operation whose completion is reported by the completion report. Additionally, the file format supported in the participating terminal 13 may be designated by the participating terminal 13 and transmitted to the conference server apparatus 11.

Also, the sequence of the conversion operation A and the conversion operation B performed by the conversion thread 24 and shown in the sequence diagram of FIG. 20 is non-limiting example. For example, in the conference system 1, the sequence of the conversion operation performed by the conversion thread 24 may be changed so that the conversion operation into a file format supported by the participating terminals 13 that are participating in the conference is prioritized.

Figure 22:
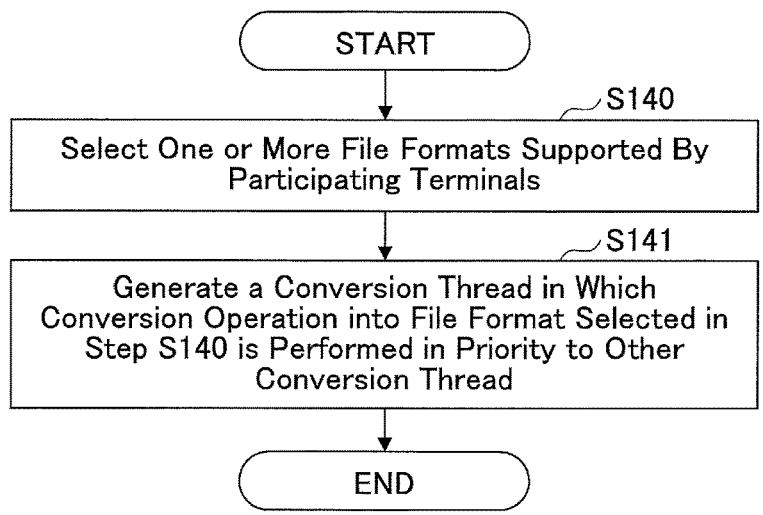
FIG. 22 is a flowchart illustrating an example conversion thread generation process for performing the conversion operations in a different sequence.

FIG. 22 is a flowchart illustrating an example conversion thread generation process for performing the conversion operations in a different sequence. In step S140, the file server apparatus 10 selects one or more file formats supported by the participating terminals 13 that are participating in the conference. Additionally, the file server apparatus 10 can acquire information indicating the file format supported by the participating terminals 13 that are participating in the conference from the conference server apparatus 11. In step S141, the file server apparatus 10 generates a conversion thread 24 in which the conversion operation into the file format selected in step S140 is performed in priority to other conversion threads 24 for performing the conversion operation into file formats not selected in step S140.

Figure 23:
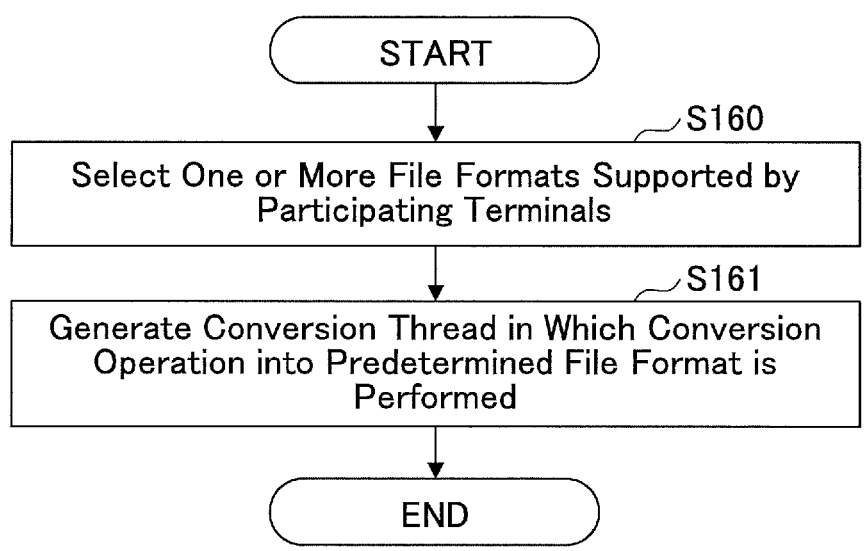
FIG. 23 is a flowchart illustrating another example conversion thread generation process for performing the conversion operations in a different sequence.

Also, in the conference system 1, the sequence of the conversion operation performed by the conversion thread 24 may be changed so that a conversion operation into a predetermined file format is prioritized. Among the file formats supported by the participating terminals 13 that are participating in the conference, the conference material in the predetermined file format needs a longer time to be distributed than the conference material in other file format. FIG. 23 is a flowchart illustrating another example conversion thread generation process for performing the conversion operations in a different sequence.

In step S160, the file server apparatus 10 selects one or more file formats supported by the participating terminals 13 that are participating in the conference. Additionally, the file server apparatus 10 can acquire information indicating the file format supported by the participating terminals 13 that are participating in the conference from the conference server apparatus 11. In step S161, the file server apparatus 10 generates the conversion thread 24 in which the conversion operation into a predetermined file format is performed, where the conference material in the predetermined file format needs a longer time to be distributed in comparison to time for distributing the conference material in other file formats selected in step S160.

<Summary>

According to the conference system 1 of the present embodiment, in a case where the added conference material is distributed to a participating terminal 13, which can display the conference material in one of a plurality of file formats, the conference material can be started to be distributed upon being converted into the one of the plurality of file formats without waiting for completion of conversion operations into other file formats.

Therefore, in the conference system 1 of the present embodiment, a participating terminal 13 can start acquiring the conference material upon receiving the completion report of the conversion operation. Hence, in the conference system 1 of the present embodiment, time taken from addition of the conference material in a certain file format to distribution of the conference material to the participating terminal 13 can be shortened, where a plurality of file formats are supported in the conference system 1 while the participating terminal 13 supports one of a plurality of file formats.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. For example, in the embodiments, the conference system 1 is described as an example information processing system. However, the conference system 1 may be applied to other systems, in which information are shared and displayed, such as a seminar system or an education system.

For example, the file server apparatus 10 and the conference server apparatus 11 are examples of information processing apparatus in the claims. The participating terminal 13 is an example of terminal device. The conversion thread 24 is an example of conversion unit. The completion report distribution unit 33 is an example of completion report distribution unit. The material acquisition unit 53 is an example of information acquisition unit. The file format is an example of format of information.

Additionally, the conference system 1 including the file server apparatus 10, the conference server apparatus 11, the registration terminal 12 and the participating terminal 13 is not a limiting example, and various system configurations may be applied in accordance with application or a purpose. The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The CPU may be achieved by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on Japanese Priority Application No. 2015-092644 filed on Apr. 30, 2015, the entire contents of which are hereby incorporated herein by reference.

What is claimed is:

1. An information processing system comprising:
an information processing apparatus; and
a plurality of terminal devices supporting different formats, each configured to acquire, from the information processing apparatus, information added by a registration terminal and converted into, information in a format supported in the terminal device,
wherein the information processing apparatus includes
a memory configured to store a program; and
one or more processors configured to execute the program stored in the memory and perform a first process including:
performing conversion operations in order with respect to a plurality of formats, the conversion operations each for
converting information newly registered in a given format by the registration terminal into information in one of a plurality of formats, and
distributing a completion report indicating completion of the conversion operation;
wherein each of the terminal devices includes
a memory configured to store a program; and
a processor configured to execute the program stored in the memory and perform a second process including
sharing a display screen within the plurality of terminal devices and the registration terminal by sending a participation request of a conference to the information processing apparatus, the display screen provided by the information processing apparatus;
determining whether the completion report indicates the format supported in the terminal device upon receiving the completion report; and
displaying a file name of the information in the display screen during the conference in a case of the format supported in the terminal device.

2. The information processing system according to claim 1, wherein the completion report indicating completion of the conversion operation into the format is distributed to terminal devices selected from the plurality of terminal devices, the display screen being shared within the selected terminal devices and the registration terminal.

3. The information processing system according to claim 1, wherein the second process includes acquiring the information in the format supported in the terminal device from the information processing apparatus in response to receiving the completion report indicating completion of the conversion operation into the format supported in the terminal device.

4. The information processing system according to claim 1, wherein the first process includes selecting one or more terminal devices supporting the one of the plurality of formats from among the plurality of the terminal devices, and
the completion report is distributed to the one or more terminal devices selected.

5. The information processing system according to claim 4, wherein the second process includes acquiring the information in the format supported in the terminal device from the information processing apparatus in response to receiving the completion report indicating completion of the conversion operation.

6. The information processing system according to claim 1, wherein in the conversion operation, the given format is converted into a certain format supported in terminal devices sharing the display screen in priority to other formats.

7. The information processing system according to claim 1, wherein the conversion operations are performed in an order in which a conversion operation into a certain format is performed in priority to other conversion operations, the acquisition of the information in the certain format from the information processing apparatus requiring a longer time in comparison to the acquisition of the information in other formats.

8. The information processing system according to claim 1, wherein the information in respective formats supported by the plurality of terminal devices is displayed in the display screen being shared within the plurality of terminal devices and the registration terminal.

9. The information processing system according to claim 1, wherein the terminal devices participate in the conference by displaying a conference screen in which the information is displayed as a conference material in the display screen at each of the terminal devices, and the conference material is registered in the information processing apparatus during the conference, the conference material being shared within the terminal devices and the registration terminal.

10. The information processing system as claimed in claim 1, wherein the file name displayed in the display screen includes an extension specifying the format.

11. A method for acquiring information performed in an information processing system including an information processing apparatus and a plurality of terminal devices supporting different formats, each configured to acquire, from the information processing apparatus, information added by a registration terminal and converted into information in a format supported in the terminal device, the method comprising:
performing, by the information processing apparatus, conversion operations in order with respect to a plurality of formats, the conversion operations each for
converting information newly registered in a given format by the registration terminal into information in one of a plurality of formats, and distributing a completion report indicating completion of the conversion operation to all or a part of the plurality of terminal devices at an end of a conversion operation; and sharing, by a terminal device of the terminal devices, a display screen within the plurality of terminal devices and the registration terminal by sending a participation request of a conference to the information processing apparatus, the display screen provided by the information processing apparatus;

determining, by the terminal device of the terminal devices, whether the completion report indicates the format supported in the terminal device upon receiving the completion report; and displaying, by the terminal device of the terminal devices, a file name of the information in the display screen during the conference in a case of the format supported in the terminal device.

12. A non-transitory computer-readable recording medium having stored therein a program for causing a computer to serve as information processing apparatus, which provides information added by a registration terminal to a plurality of terminal devices supporting different formats, to perform a process comprising:

performing, in order with respect to plurality of formats, an conversion operation for converting information newly registered in a given format by the registration terminal into one of the plurality of formats and distributing a completion report indicating completion of the conversion operation to all or a part of the plurality of terminal devices at an end of a conversion operation, in which at all or the part of the plurality of terminal devices, a file name of the information is displayed in a display screen during a conference in a case in which a format indicated by the completion report is supported, the display screen being shared in the plurality of terminal devices.

* * * * *